(12) United States Patent
Grieco et al.

(10) Patent No.: US 11,325,854 B2
(45) Date of Patent: May 10, 2022

(54) METHOD AND APPARATUS FOR DRYING AND CONSOLIDATING A PREFORM FOR OPTICAL FIBRES

(71) Applicant: Prysmian S.p.A., Milan (IT)

(72) Inventors: Stefano Grieco, Milan (IT); Valeria Caronna, Milan (IT); Antonio Schiaffo, Milan (IT)

(73) Assignee: PRYSMIAN S.p.A., Milan (IT)

( * ) Notice: Subject to any disclaimer, the term of this patent is extended or adjusted under 35 U.S.C. 154(b) by 295 days.

(21) Appl. No.: 16/498,030

(22) PCT Filed: Mar. 29, 2017

(86) PCT No.: PCT/EP2017/057385
§ 371 (c)(1),
(2) Date: Sep. 26, 2019

(87) PCT Pub. No.: WO2018/177514
PCT Pub. Date: Oct. 4, 2018

(65) Prior Publication Data
US 2020/0031706 A1 Jan. 30, 2020

(51) Int. Cl.
*C03B 37/014* (2006.01)
(52) U.S. Cl.
CPC .................. *C03B 37/0146* (2013.01)
(58) Field of Classification Search
CPC .................................................. C03B 37/0146
See application file for complete search history.

(56) References Cited

U.S. PATENT DOCUMENTS

| 4,906,268 A | 3/1990 | Lane et al. |
|---|---|---|
| 4,969,941 A | 11/1990 | Kyoto et al. |
| 7,752,869 B2 | 7/2010 | Otosaka et al. |
| 2006/0112733 A1 | 6/2006 | Ishihara et al. |
| 2008/0011019 A1 | 1/2008 | Hayami et al. |
| 2010/0294002 A1 | 11/2010 | Ito et al. |
| 2016/0130173 A1 | 5/2016 | Uchida |

FOREIGN PATENT DOCUMENTS

| CN | 1636903 A | 7/2005 |
|---|---|---|
| CN | 103663958 A | 3/2014 |
| CN | 104968622 A | 10/2015 |
| EP | 0744383 A1 | 9/1999 |
| JP | 2002145628 A | 5/2002 |

(Continued)

OTHER PUBLICATIONS

International Search Report (ISR) for PCT/EP2017/057385 dated Dec. 13, 2017 (5 pages).

(Continued)

*Primary Examiner* — Cynthia Szewczyk
(74) *Attorney, Agent, or Firm* — Shumaker, Loop & Kendrick, LLP (57) ABSTRACT

A process and an apparatus for drying and consolidating an optical fibre preform in a furnace tube comprising a heating chamber, wherein an extension tube having an extension chamber configured to house at least a length portion of the preform is removably joined to the furnace tube and the drying process starts with the preform not completely inserted into the furnace tube, an upper length portion of the preform being surrounded by the extension tube joint to the furnace tube.

14 Claims, 6 Drawing Sheets

(56) References Cited

FOREIGN PATENT DOCUMENTS

| JP | 2003267736 A | 9/2003 |
|---|---|---|
| WO | 2016198125 A1 | 12/2016 |

OTHER PUBLICATIONS

Written Opinion of the International Searching Authority for PCT/EP2017/057385 dated Dec. 13, 2017 (6 pages).
Chinese Office Action (CN OA) for CN Pat. App. No. 201780089015.1 dated Aug. 30, 2021 (20 pages).
Indian Office Action (IN OA) for IN Pat. App. No. 201917036933 dated Mar. 4, 2022 (6 pages).

METHOD AND APPARATUS FOR DRYING AND CONSOLIDATING A PREFORM FOR OPTICAL FIBRES

FIELD OF THE INVENTION

The present invention relates to a process and an apparatus for manufacturing an optical fibre preform and in particular to a process and apparatus for manufacturing a glass preform for optical transmission fibres.

BACKGROUND

A common procedure to obtain a glass preform to be drawn down to an optical fibre of typical diameter of about 125 μm comprises a first process for producing a core rod of solid glass and a second process in which an overcladding is added to the core rod, for example by deposition of soot about the core rod or by jacketing the core rod in a glass tube (rod-in-tube technology). Core rods may be made by outside deposition processes, such as outside vapour deposition (OVD) and vapour axial deposition (VAD) or by inside deposition processes, such as Modified, or Furnace Chemical Vapour Deposition (MCVD/FCVD), or Plasma Chemical Vapour Deposition (PCVD). When made by OVD or VAD, a soot precursor body is formed, which is the dried to remove water and consolidated to form a core glass body. A stretching often follows the consolidation in order to reduce the diameter of the glass body which is then severed into a plurality of core rods.

Formation of a cladding region on the core rod by a flame hydrolysis deposition process, such as by OVD, is often employed because it allows a relatively fast and economical process of producing a soot optical preform from a core rod. Partially porous soot preforms are subsequently treated with a drying agent and they are then consolidated inside a furnace into a dense glass preform at temperatures higher than the glass transition temperature.

Drying is performed by heating the preform to a typical temperature of about 1100° C. in the presence of one or more drying gases, such as a mixture of helium and chlorine. Consolidation is performed by heating the dried preform typically to a temperature between 1450° C. and 1550° C.

In processes commonly used for dehydration and consolidation, a porous or partially porous soot preform is inserted into a furnace comprising a cylindrically-shaped muffle. The preform is then pulled up as a transparent silica glass preform above the furnace after vitrification. Given that drying and consolidation take place at different temperatures, the furnace muffle is often configured to have different zones for the drying and the consolidation phases. In some furnaces, during consolidation, the preform is lowered through a central hot zone set at a temperature inducing consolidation.

U.S. Pat. No. 4,906,268 observes that, in ovens employing a stationary central "hot zone" and a moving blank, to accommodate both the central hot zone and the cooler end zones, muffles of a length of about 3-4 times the length of the longest blank to be processed are necessary. With increasing the length of the preform, the Patent acknowledges, the physical space needed to house an oven capable of processing long blanks becomes prohibitive. To overcome this problem, a method is provided, which comprises the steps of: placing a porous glass preform in a stationary elongated chamber surrounded by a stationary elongated susceptor, and sequentially heating a plurality of selected portions of the chamber above the sintering temperature of the preform so as to consolidate the preform, said portions being spatially distributed along the length of the chamber, wherein the plurality of selected portions of the chamber are heated by moving an energized induction heating coil.

Patent application EP0744383 A1 describes a method using a consolidation furnace of U.S. Pat. No. 4,906,268, which is aimed to provide an increase in the rate of consolidation of porous glass preforms. The disclosed method employs an isothermal pre-sinter phase in addition to the isothermal drying phase and a scan-type sinter phase (i.e. by moving the coil) including subjecting one end of the preform to a hot zone, the temperature of which is sufficient to densify and clarify the one end; and moving the hot zone toward the end of the preform.

A furnace muffle is generally closed by a lid and both can be provided, at their respective junction part, with a flange to keep airtightness during dehydration and consolidation. US 2006/0112733 describes an equipment for heating a soot glass deposit body and thereby vitrifying a preform, which comprises a furnace muffle tube in which a soot glass deposit body is placed, a lid for sealing up an inlet-outlet opening of the furnace muffle tube, and a heater for heating the soot glass deposit body. In this equipment, the surface roughness in the respective junction surfaces of the furnace muffle tube and the lid is 1.0 μm or less, the flatness degree in the respective junction surfaces of the furnace muffle tube and the lid is 30 μm or less, and the load on the junction surface is equal to or more than 98 N.

US 2008/0011019 relates to a method of manufacturing an optical fibre preform, comprising dehydrating a porous glass preform including a porous glass layer by passing the porous glass preform through a heating area in an atmosphere of dehydration gas. The dehydrating includes setting Pcl and V to satisfy $0.0773 \cdot e^{7.4873 \cdot \rho} \leq Pcl \cdot T \cdot L/V$, according to ρ, T, and L, where Pcl (MPa) is a partial pressure of chlorine gas in the dehydration gas, T(° C.) is a process temperature, L (mm) is a length of an area in the heating area where a temperature is 1150° C. or higher, V (mm/h) is a relative moving speed of the porous glass preform with respect to the heating area, and ρ (g/cm$^3$) is an average bulk density of the porous glass layer.

US 2016/0130173 describes an optical fibre glass base material manufacturing apparatus, comprising: a furnace core tube that houses a porous glass base material; a movement mechanism that moves the porous glass base material in a longitudinal direction thereof in the furnace core tube; a first heating section that heats and dehydrates the porous glass base material in the furnace core tube; and a second heating section that is arranged downstream from the first heating section in a movement direction of the porous glass base material, and sinters the porous glass base material by heating a portion of the porous glass base material in the longitudinal direction. The first heating section has a total length that is greater than or equal to a total length of the porous glass base material. The first heating section includes a plurality of heaters that are arranged along a longitudinal direction of the furnace core tube, each having a length less than a length of the porous glass base material, and wherein each can have a heating temperature thereof set independently.

SUMMARY OF THE INVENTION

There exists a growing interest in processing optical fibre preforms of increasing length, such as, for example, of a length from 2.5 to 3.5 meters.

The Applicant has observed that an apparatus such that described in U.S. Pat. No. 4,906,268 and in EP0744383 A1 is complicated to build and the relative movement of the preform with respect to the heating elements by means of external moving parts can be troublesome.

Applicant has considered a furnace tube for dehydration and consolidation having a first heating zone for dehydration of a glass soot preform and a second heating zone for consolidation of the dried glass soot preform to obtain a solid glass preform. Such furnace tubes typically comprise a cooler zone placed under the second heating zone for cooling the consolidated preform before removing it from the furnace tube. To accommodate these three zones at different temperatures, the length of the chamber of the furnace tube housing the preform are usually required to be at least about 2.5 times longer than the preform length.

The Applicant has observed that dehydration of the preform can be achieved by moving the preform through a first heating zone of a relatively limited length, i.e. shorter than the length of the preform. The Applicant has realised that, if the drying process may start with the preform not completely inserted into the furnace tube, the overall length of the furnace tube can be kept relatively short in relation with the length of the preform. According to the present disclosure, a chamber for housing at least a length portion of the preform is provided, wherein the chamber can be connected to the heating chamber of the furnace tube so as to form a vertical extension of the heating chamber. Drying and consolidation of the preform may take place by using a furnace tube of relatively short length with respect to the preform length.

The present disclosure relates to a method for manufacturing an optical fibre preform, the method comprising:
  providing a furnace comprising a furnace tube having an elongated heating chamber configured to house a preform, the heating chamber having an upper entry opening for the insertion of the preform;
  providing an extension tube comprising an extension chamber having a lower opening and configured to house at least a length portion of a preform;
  inserting a lower length portion of a porous optical fibre preform in the heating chamber in such a way that an upper length portion of the porous preform lies outside of the furnace tube;
  enclosing the upper length portion of the optical fibre preform in the extension tube;
  joining the furnace tube with the extension tube so as the lower opening of the extension chamber is in communication with the upper entry opening of the heating chamber to form a single chamber;
  dehydrating the lower length portion of the preform by exposing said lower length portion to a first heating zone of the furnace tube set at a dehydration temperature, and
  gradually lowering the preform through the first heating zone so as to dehydrate the upper length portion of the optical fibre preform.

Preferably, the furnace tube has a second heating zone positioned below the first heating zone and set at a consolidation temperature, wherein gradually lowering the preform further comprises exposing successive length portions of the preform to the first heating zone and subsequently to the second heating zone until the whole preform has passed through the first heating zone.

Preferably, the method further comprises, after the preform has passed through the first heating zone, continuing to gradually lower the preform through the second heating zone until the whole preform has passed through the second heating zone so as to consolidate the whole preform.

Preferably, before enclosing the upper length portion of the preform in the extension tube, the tube is held in suspension in horizontal alignment with the preform so that the extension tube surrounds the preform when lowered onto the preform.

Preferably, dehydrating comprises flowing drying gases across the extended elongated chamber.

Preferably, the method further comprises, before inserting a lower length portion of a porous optical fibre preform, holding in suspension a porous preform by a supporting member connected to a first lifting mechanism for vertically moving the preform.

Preferably, the method further comprises, after providing an extension tube and before enclosing the upper length portion of the preform, holding in suspension the extension tube above the preform and lowering the extension tube until it surrounds and encloses the upper length portion of the preform.

Preferably, the extension tube is connected to a second lifting mechanism for a vertical movement independent of the vertical movement of the preform.

Preferably, the first heating zone is vertically positioned close to the upper entry opening such that the preform enters the first heating zone right after the insertion in the furnace tube.

Preferably, the first heating zone has an upper end at a distance of not less than 30 cm from the upper entry opening of the furnace tube, more preferably from 30 cm to 60 cm from the upper entry opening of the furnace tube.

Preferably, the length of the first heating zone is of from 50 cm to 100 cm.

Preferably, gradually lowering of the preform is at a downfeed rate is of from 4 mm/min to 7 mm/min.

The present disclosure relates also to an apparatus for drying a porous optical fibre preform, comprising:
  a furnace comprising a furnace tube comprising an elongated heating chamber for housing and moving a preform in a vertical direction, wherein the heating chamber has an upper entry opening for the insertion of the preform, the furnace further comprising a first heater surrounding the furnace tube for heating a first longitudinal section of the heating chamber defining a first heating zone, and
  an extension tube comprising an extension chamber having a lower opening, the extension tube being removably joint to the furnace tube so as to close the upper entry opening, wherein the lower opening is in communication with the upper entry opening when the extension tube is joined to the furnace tube to form a single chamber, the extension chamber being configured to house at least a length portion of the preform.

Preferably, the furnace tube and the extension tube are made of glass so as joining the furnace tube with the extension tube is a glass-to-glass seal.

Preferably, the furnace tube comprises a first flange positioned radially outwardly the upper entry opening and the extension tube comprises a second flange positioned radially outwardly the lower opening, the first and the second flange comprising a respective joining surface, wherein joining is achieved by joining the joining surfaces of the first and of the second flanges.

Preferably, the apparatus is for drying and consolidating a porous preform and the furnace further comprises a second heater placed below the first heater and surrounding the furnace tube for heating a second longitudinal section of the heating chamber defining a second heating zone for consolidation of the preform.

Preferably, the apparatus further comprises a supporting member for holding in suspension a preform, the supporting member being operatively connected to a first lifting mechanism for the translational movement of the preform up and down in the longitudinal direction, wherein the supporting member comprises a holding portion for holding the preform and a supporting rod for the connection with the first lifting mechanism.

Preferably, both the heating chamber and the extension chamber have a generally cylindrical shape. Preferably, the heating chamber has an inner diameter substantially equal to the inner diameter of the extension chamber and form an extended hollow cylindrical chamber when the two chambers are joined.

In some embodiments, the length of the extension tube is selected so as to surround an upper length portion of from 30% to 50% of the total preform length.

Preferably, the length of the extension tube is between 0.5 m and 2.5 m.

Preferably, the apparatus comprises a second lifting mechanism operatively connected to the extension tube, wherein the second lifting mechanism is configured for holding in suspension the extension tube above the preform when it is not joined to the furnace tube and for causing the extension tube to move up and down independently of the supporting member.

Preferably, the extension tube comprises a cover plate opposite to the lower opening and having a throughhole through which the supporting rod passes.

Preferably, the first heating zone has a length shorter than the length of the optical fibre preform. Although the present invention may envisage an extension tube with a length equal to or even longer than the length of the preform to be treated, preferably, the length of the extension tube is selected so that only a length portion of the preform is surrounded by the extension tube. The selection of a suitable length for the extension tube may partly depend on the furnace configuration and in particular on the extent of the first heating zone for dehydration.

The Applicant has noted that, in case handling of preforms of significantly different lengths in the same furnace is necessary, extension tubes of different length can be employed.

Replacement of the extension tube can easily take place without a significant increase in manufacturing costs.

BRIEF DESCRIPTION OF THE DRAWINGS

The present invention will now be described in more detail hereinafter with reference to the accompanying drawings, in which some, but not all embodiments of the invention are shown.

Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

Figures 1, 1A, 1B:
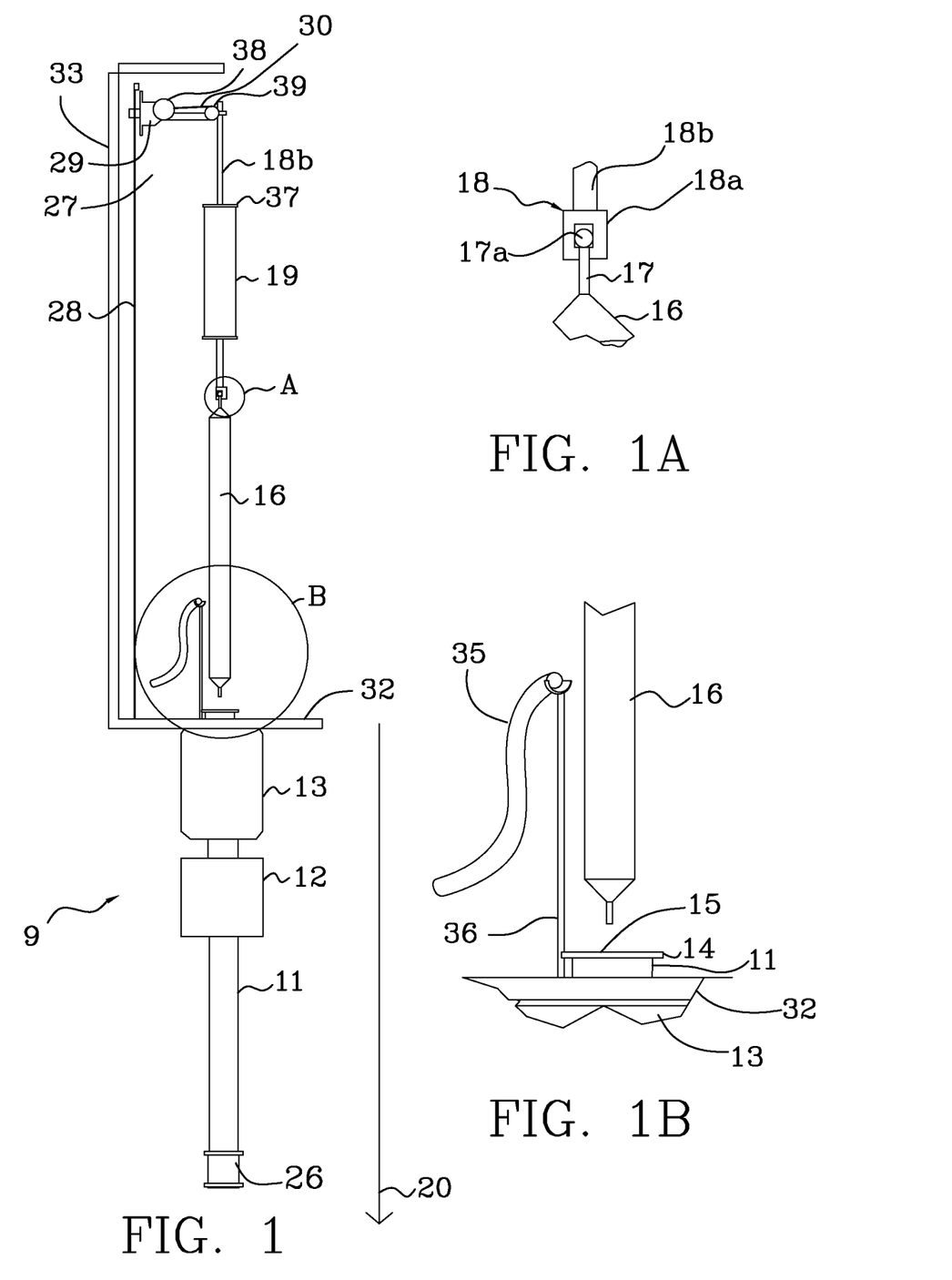
FIG. 1 is a side view of an apparatus for drying and consolidating a preform, in an initial process stage, according to an embodiment of the present invention.
FIG. 1A represents an enlarged portion of FIG. 1 indicated by circle A.
FIG. 1B represents an enlarged portion of FIG. 1 indicated by circle B.
Figure 2:
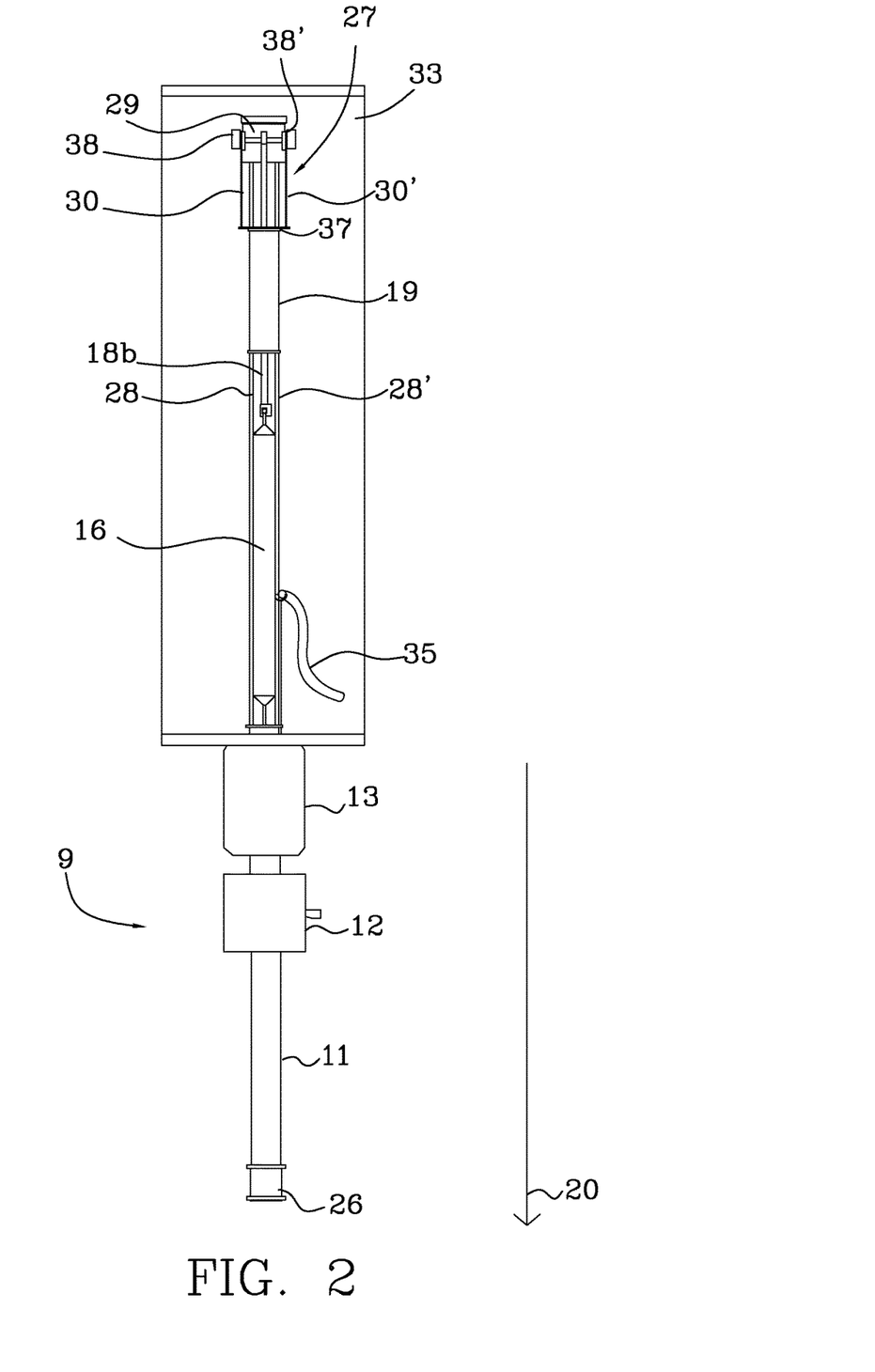
FIG. 2 is a front view of the apparatus of FIG. 1.

FIGS. 1 and 2 are a side view and a front view, respectively, of an apparatus for drying and consolidating an optical fibre preform, according to an embodiment of the invention. An apparatus 10 comprises a furnace 9, which can be of conventional type, comprising a hollow elongated furnace tube 11 extending in a longitudinal direction, indicated with axis 20 in the figure. The furnace tube forms an elongated chamber, referred to as heating chamber. The heating chamber is configured for housing an optical fibre preform. As shown more in detail in FIG. 1B, the heating chamber has an upper entry opening 15 for the insertion of the preform in the furnace tube. Preferably, the heating chamber has a substantially cylindrical shape. The length of the heating chamber is larger than the length of the preform so that the latter can move up and down, in the longitudinal direction, inside the heating chamber.

Preferably, the furnace tube 11 is made of glass, more preferably quartz. Customarily, furnace tubes for the processing a silica-based preform for the production of optical transmission fibres are made of highly pure quartz to avoid contaminations in the preform during heating.

The furnace tube 11 further comprises a first flange 14 placed radially outwardly the upper entry opening 15. The first flange 14 has an upper surface (non visible in the figures), indicated in the following with first joining surface. In an embodiment, the first flange is an annular flange.

The furnace 9 comprises a first heater 13 surrounding the furnace tube 11. The first heater defines a first heating zone extending over a first length of the furnace tube and thus of the heating chamber. In operation, the first heating zone is set at a first temperature suitable for dehydration of the porous layers of the preform.

The Applicant has observed that complete drying can be achieved by moving the preform through a heating zone of a relatively limited longitudinal extension, at a suitable downfeed rate. The Applicant has realised that, if the size of the first heating zone in the downfeed direction is reduced, a significant reduction of the furnace tube length can be obtained by positioning the first heating zone in an upper portion of the furnace tube.

Preferably, the first heater 13 surrounds the furnace tube 11. Preferably, the first heater has a ring shape which may comprise one or more annular heating elements.

A second heater 12, positioned below the first heater 13, surrounds the furnace tube 11. The second heater defines a second heating zone extending over a second length of the furnace tube, the second heating zone being positioned below the first heating zone. In operation, the second heating zone is set at a second temperature for consolidation of the porous preform into a solid glass preform. The second temperature is higher than the first temperature and it is usually of from 1450° C. to 1550° C. In an embodiment, the second temperature is of 1500° C.

Preferably, the second heater 12 has a ring shape which may comprise one or more annular heating elements. For example, the first and the second heaters 13, 12 are attached to the outer circumference of the furnace tube.

Figure 3:
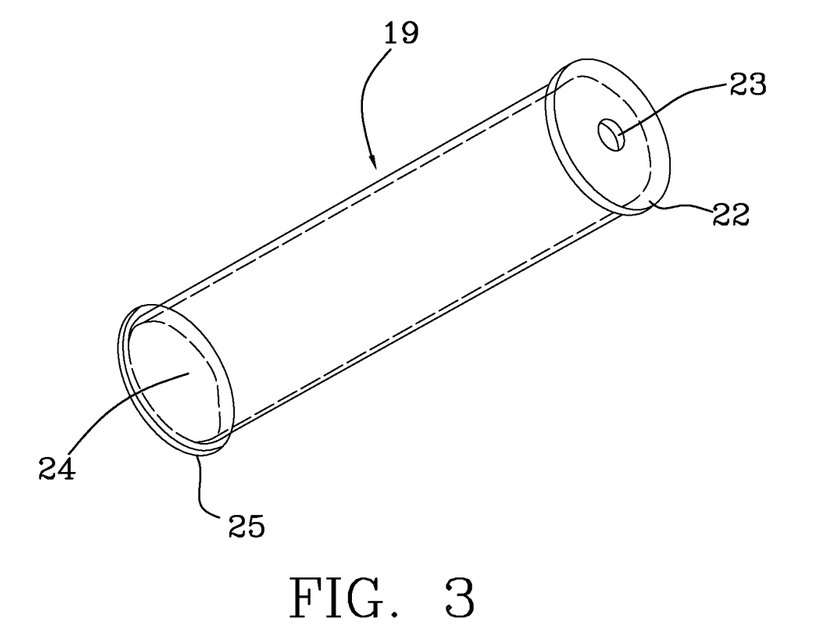
FIG. 3 is a perspective view of the extension tube according to an embodiment of the present invention.
Figure 4:
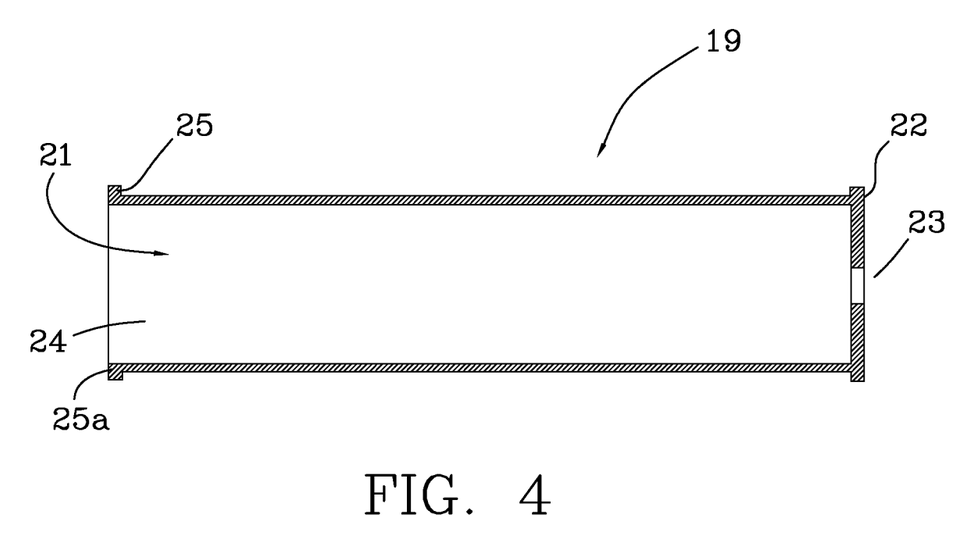
FIG. 4 is a sectional view of the extension tube of FIG. 3.

The apparatus 10 further comprises a hollow extension tube 19, shown in more detail in FIGS. 3 and 4. The extension tube 19 comprises an elongated chamber 21, referred to as extension chamber, for the housing of at least a length portion of the preform. Preferably, the extension chamber has a generally cylindrical shape.

Preferably, the heating chamber has an inner diameter substantially equal to the inner diameter of the extension tube so as to form an extended hollow cylindrical chamber when the two chambers are joined.

Preferably, the extension tube has a length such that an upper length portion of the preform is contained in the extension tube when the latter surrounds the preform. In a preferred embodiment, the length of the extension tube is selected to be equal to the difference between the length of the preform and the length of the dehydration zone of the furnace. In some embodiments, the length of the extension tube is selected so as to surround an upper length portion of from 30% to 50% of the total preform length. Preferably, the length of the extension tube is between 0.5 and 2.5 m. For example, the extension tube has a length of 1.2 m.

The extension chamber 21 is provided at one of its ends with a lower opening 24 for the insertion of the preform. Opposite to the lower opening 24, the extension tube comprises a cover plate 22 having a through-hole 23, preferably centrally positioned in said cover plate 22. A second flange 25 is positioned at the lower opening 24 and extends radially outwardly from the lower opening. The second flange 25 has an exterior-facing surface 25a, which corresponds to the below surface when the extension tube 19 is placed in the apparatus for drying and consolidating. The surface 25a is referred to as the second joining surface. The extension tube 19 is preferably one-piece. Preferably, the extension tube is made of quartz.

Referring back to FIGS. 1 and 2, in the shown embodiment, the first flange 14 is placed at the top of the furnace tube so that the first joining surface faces the second joining surface 25a of the flange of the extension tube 19.

The first and second joining surfaces of the respective flanges 14, 25 are mating surfaces when the extension tube 19 is placed on top of the furnace tube so as to put in communication the heating chamber with the extension chamber and form an extended elongated chamber. With the furnace tube and the extension tube made of glass, preferably quartz, joining of the furnace tube with the extension tube is a glass-to-glass seal. The first and the second joining surfaces are flat surfaces, preferably polished to reduce the surface roughness so as to prevent gas leakage between the surfaces. A suitable surface roughness is for example 0.8 Ra. Surface finishing for reducing roughness and improving flatness of the quartz joining surfaces can be made in a way per se known.

Dehydration of the preform is achieved by moving the preform through a first heating zone of a relatively limited length, i.e. shorter than the length of the preform. The first heater and thus the first heating zone extends along the furnace longitudinal direction for a first length.

Preferably, the first length of the first heating zone is of from 50 cm to 100 cm. For example, the first length is 60 cm.

By providing an extension chamber for housing a length portion of the preform, drying may take place in a furnace having a first heating zone arranged at the top of the furnace tube. In the preferred embodiments, the first heating zone for drying the preform is placed close to the entry opening of the furnace tube.

With "close to the entry" of the furnace tube, when referred to the arrangement of the first heater/heating zone, it is meant the uppermost possible vertical position while taking into account practical considerations, such as the isolation and furnace shell surrounding the heating elements. In some embodiments, the first heater 13 is arranged so as to form a first heating zone having an upper end at a distance of not less than 30 cm from the entry opening 15 of the furnace tube, preferably from 30 cm to 60 cm from the entry opening of the furnace tube 11.

With the first heater 13 arranged at a vertical position close to the entry opening 15 of the furnace tube, the preform lies in the first heating zone right after the insertion in the furnace tube.

The second heating zone extends along the furnace longitudinal direction for a second length.

Preferably, the second length of the second heating zone is of from 30 cm to 50 cm.

In some embodiments, the preform has a length of from 2.0 to 3.5 meters.

In some embodiments, the heating chamber of the furnace tube extends below the second heating zone for a length configured to house the whole preform. This longitudinal section of the heating chamber positioned below the second heating zone is not heated and defines a cooling zone for allowing the preform to cool, preferably while flowing inert gas across the furnace.

Preferably, the furnace tube has a length of two times the length of the longest preform to be processed in the furnace.

The furnace 9 comprises a gas inlet opening 26 connected to the heating chamber of the furnace tube 11 for the supply of one or more drying gases, such as a mixture of helium and chlorine. Gases entering the gas inlet 26 pass through the porous glass to remove impurities and reduce the water content of the glass. Usually, gases are discharged from a gas discharge opening positioned at the opposite side of the furnace body with respect to the gas inlet opening, e.g. bottom to top. According to the preferred embodiments, elements for carrying away the gases from the furnace tube and from the extension tube, when the two chambers are joined, are connected to the extension tube.

Figure 6:
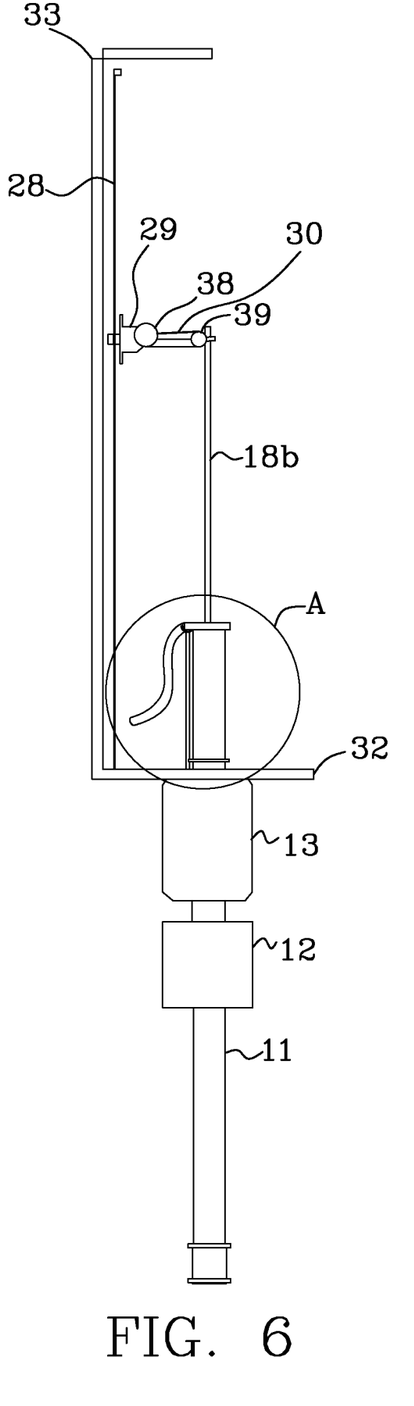
FIG. 6 is a side view of the apparatus of FIG. 1, representing a process stage subsequent to that shown in FIG. 5.
Figure 6A:
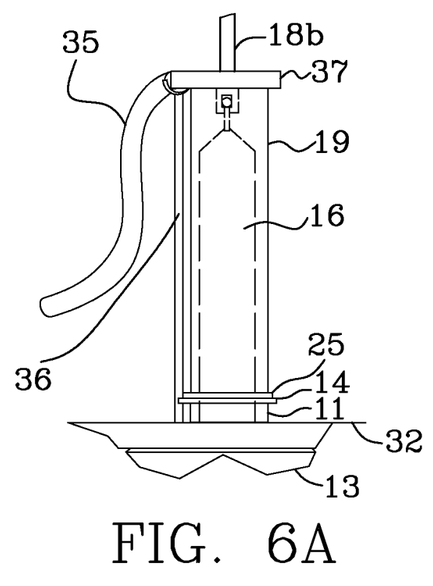
FIG. 6A represents an enlarged portion of FIG. 6 indicated by circle A.

With reference to FIG. 1B, a gas exhaust pipe 35 is placed at a height above the top of the furnace tube for connection with the extension tube when it is joined to the furnace tube (FIG. 6A). In the embodiment shown in the figures, an exhaust hood 37 for the connection with the exhaust pipe 35 is placed on the top of the extension tube 19, preferably fixed on cover plate 22. The exhaust hood 37 has a through-hole in axis with that of the cover plate 22. The exhaust hood 37, which may be provided with a fan, has a port (not visible) as gas discharge opening, which is connected with the exhaust pipe 35 when the extension tube is connected with the furnace tube.

A shaft 36 is placed in the vicinity of the entry of the furnace tube for holding the pipe in position for the connection to the gas discharge opening of the exhaust hood 37. It is to be understood that the presence of a means for holding the discharge pipe is optional since other configurations may be envisaged for the discharge of the gases from the extension chamber enclosing the preform during the process of dehydration and consolidation.

The apparatus 10 further comprises a moving system 27 for the translational movement of the preform 16 and of the extension tube 19. In the embodiment of the figures, a downfeed tower 33 acts as a supporting structure, which the moving system 27 is fixed to. The downfeed tower 33 stands on a base 32, which may be an upper floor having an opening for communication with the furnace tube, standing on a lower floor (non shown). In the embodiment, the upper entry opening 15 of the furnace tube and the surrounding flange 14 are positioned on the upper floor 32.

In the usual ways, the preform 16 is suspended on a supporting member 18, shown more in detail in FIG. 1A, which is an enlarged portion of FIG. 1 as indicated by circle A. Generally, the preform is suspended by a quartz handle 17, which is joined or integral to the preform. For example, in case of porous preform with a soot overcladding layer, the handle is typically fused to the core rod prior to the overcladding deposition. In the present embodiment, vertical suspension of the preform 16 makes use of an enlarged-width portion 17a of the cylindrically shaped handle 17, such as a ball-shaped portion, which is housed in the supporting member 18. The supporting member 18 comprises a supporting portion 18a, on which the enlarged-width portion 17a rests, and a supporting rod 18b for connection of the supporting member to the moving system 27. Preferably, the supporting member 18 is made of quartz. The supporting member 18 can be of one-piece construction.

The moving system comprises a first lifting mechanism and a second lifting mechanism. The first lifting mechanism is configured to lower the preform into the furnace tube 11 and to lift the preform up from the furnace tube when the process of drying and consolidation has been completed. In the embodiment, the first lifting mechanism raises and lowers a motor-driven carriage 29 along a pair of guide rails 28, 28' arranged parallel to the longitudinal axis of the furnace tube 11 for the vertical movement. For example, the guide rails 28, 28' stand on the floor 32 (as shown in FIG. 1) or they are fixed to the downfeed tower 33. The supporting member 18, in particular the supporting rod 18b, is connected to the carriage 29 so that the translational motion of the carriage is transferred to the preform 16.

The extension tube 19 is moved up and down by a second lifting mechanism that moves cables 30 and 30', which are spooled on a pair of reels 38, 38' coupled together and mounted on the carriage 29. An idler pulley 39 can be used to maintain tension of cables 30, 30'. The reels 38, 38' are driven by a motor (not shown) mounted on the carriage 29 for winding and unwinding cables 30, 30'. The cables 30 and 30' are connected with the extension tube 19 for enabling the up and down movement of the extension tube, which is performed by controlling the motor of the reels.

The horizontal position (i.e. in a plane perpendicular to the longitudinal axis 20) of the supporting rod 18b is such that to allow the supporting rod 18b of the supporting member 18 to pass through the through-hole 23 of the extension tube 19 and the corresponding through-hole of the exhaust hood 37 without mutual interference. For example, lateral dimensions (e.g. diameters) of the supporting rod and of the through-hole 23 are such that a lateral play exists between the support rod and the extension tube. An alignment system, per se known and not shown, can be used for adjusting the horizontal position of the preform and/or of the extension tube.

Automatic control enabling independent movement of the carriage 29 and the cables 30, 30' can be performed in ways per se known, such us by means of a motion controller software platform logically connected to the motors of the carriage and of the cable reels for control of the vertical location, along longitudinal axis 20, of the preform and the extension tube.

It is to be understood that other configurations of the moving system 27 may be envisaged, as long as they provide an independent vertical movement of the extension tube and the preform. In a first initial stage, shown in FIGS. 1 and 2, the preform 16 is positioned above the furnace tube, while the extension tube 19 is positioned above the preform. The extension tube is horizontally arranged so as to surround the preform when lowered onto the preform.

Figure 5:
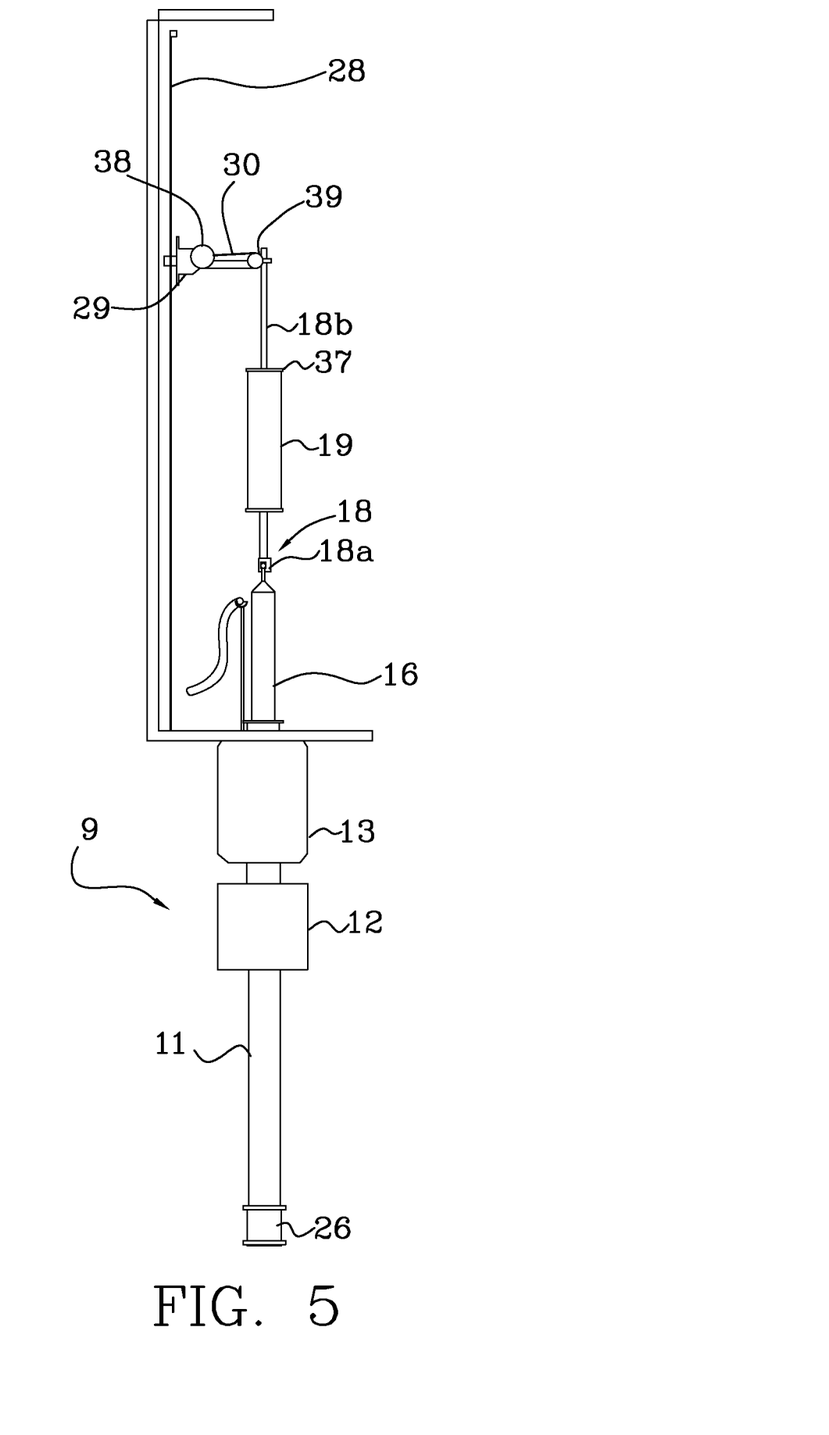
FIG. 5 is a side view of the apparatus of FIG. 1 in a subsequent process stage, when the preform is partially inserted in the furnace tube.

The preform 16 is then lowered into the furnace tube 11. FIG. 5 shows a subsequent process stage in which the preform is partially inserted in the furnace tube. In particular, a lower length portion of the preform is inserted in the furnace tube to be positioned in the first heating zone. If the first heating zone is placed close to the entrance of the furnace tube, the length of the inserted lower portion of the preform approximately corresponds to the first length of the first heating zone. An upper portion of the preform lies outside of the furnace tube, as shown in FIG. 5. The extension tube 19 is positioned above the preform, for example at the same vertical location of the initial stage of FIGS. 1 and 2 or at a lower vertical location. At this stage, first and second heaters 13, 12 are maintained at a relatively low temperature, i.e. from 1000° C. to 1300° C.

Figure 7:
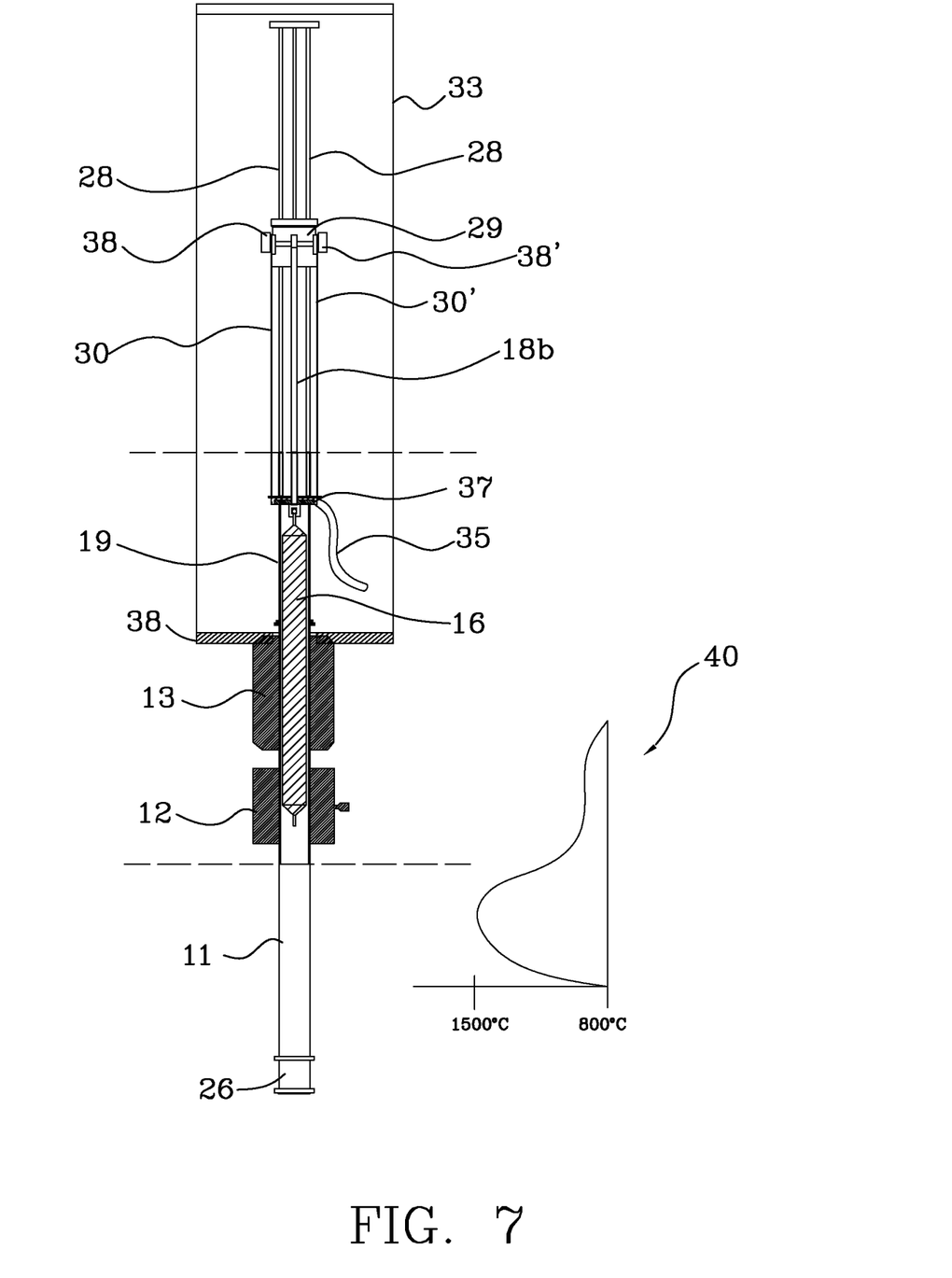
FIG. 7 is a sectional view of the apparatus in the process stage of FIG. 6.

FIG. 6 shows a process stage subsequent to that of FIG. 5. FIG. 7 is a sectional view of the apparatus in the process stage of FIG. 6. The preform is in the same vertical position as that shown in FIG. 5, i.e. the vertical location of carriage 29 has not changed, whereas the extension tube has moved down. The extension tube surrounds and contains the upper length portion of the preform lying outside of the furnace tube.

Preferably, the extension tube descents after the preform is partly inserted in the furnace. It is however to be understood that descent of the extension tube to a vertical location such that to surround the upper length portion of the preform may be performed when the preform has not entered the furnace, for example in the stage shown in FIGS. 1 and 2.

When the extension tube 19 is joint to the furnace tube, the temperature of the second heater 13 is increased to a temperature suitable for consolidation, e.g. 1500° C. As shown in more detail in FIG. 6A, the extension tube is lowered onto the furnace tube to join the first flange 14 with the second flange 25 and create a sealed chamber formed by the extension chamber and the heating chamber. The discharge pipe 35 is connected to the gas discharge opening (not shown) of the exhaust hood 37 and drying gases are introduced in the furnace through inlet opening 26 to flow through the soot preform. The dehydration process starts by drying the portion of the preform positioned in the first heating zone. Preferably, the portion of the preform inserted in the furnace tube lies above the second heating zone so as to prevent consolidation of the lowermost portion of the preform before its drying has taken place. Preferably, the first heating zone is at a temperature of from 1000° C. to 1200° C. The preform is maintained in this position for a certain time, preferably from 60 to 90 minutes.

An exemplary temperature profile 40, along the furnace tube, for dehydration and consolidation is shown in FIG. 7.

Subsequently, the preform is gradually lowered through the first heating zone at a given rate so as to dehydrate the whole preform when the entire preform length has passed the first heating zone. Preferably, the downfeed rate is of from 4 mm/min to 7 mm/min. For example, the downfeed rate is of 5 mm/min.

When the preform is down driven through the first heating zone 13, successive longitudinal portions of the preform are exposed to the first heating zone 13 and subsequently to the second heating zone 12.

Preferably, the second heating zone 12 set at a temperature suitable for vitrification of the dried soot material, is positioned at a relatively short distance from the first heating zone so as, during the descent of the preform, two different portions of the preform are exposed to a first heating zone and to a second heating zone, respectively, until the whole preform exits the first heating zone. Then, a remaining upper portion of the dried preform undergoes consolidation by passing through the second heating zone in order to fully consolidate the preform from the bottom to the top. The process of drying and consolidation ends when the whole preform exits from the second heating zone.

In some embodiments, during dehydration and consolidation, the preform rotates about its longitudinal axis in order to improve axial symmetry. In ways per se known, a rotation transmission mechanism (not shown) coupled to the supporting rod 18b transmits rotation to the preform.

After vitrification of the whole preform has been carried out, the temperature of the second heater is lowered. The preform is lowered to the cooling zone for cooling, preferably in the presence of inert gases flowing through the furnace tube.

After cooling, the furnace tube is opened by lifting the extension tube up and the preform is removed from the furnace tube.

It should be understood that the terms "lower" or "below" and "upper" or "above", with reference e.g. to the openings of the chambers housing the preform and to the longitudinal portions of the preform, are used to indicate the relative position of the elements to one another in their orientation during processing of the preform.

By "porous preform" in this application it is meant both a totally porous preform (e.g. for the formation of a glass core rod) and a partially porous preform comprising a porous soot layer for the formation of the overcladding on a core rod.

The apparatus and the process according to present disclosure are particularly suitable for the drying and consolidating of a final preform having a porous overcladding layer formed around a core rod. In ways per se known, after consolidation, the solid glass preform can be drawn in an optical fibre.

Preferably, the porous glass soot preform is a silica-based porous glass preform for the fabrication a silica-based optical fibre of low attenuation for use in telecommunication systems. The porous soot layers can be formed by a flame hydrolysis process of silica-based soot, such as outside vapour deposition (OVD) and vapour axial deposition (VAD).

The invention claimed is:

1. A method for manufacturing an optical fibre preform comprising:

providing a furnace comprising a furnace tube having an elongated heating chamber configured to house a preform, the heating chamber having an upper entry opening for the insertion of the preform;

providing an extension tube comprising an extension chamber having a lower opening and configured to house at least a length portion of a preform;

inserting a lower length portion of an optical fibre preform, the preform being a porous preform, in the heating chamber in such a way that an upper length portion of the optical fibre preform lies outside of the furnace tube;

enclosing the upper length portion of the optical fibre preform in the extension tube;

joining the furnace tube with the extension tube so as the lower opening of the extension chamber is in communication with the upper entry opening of the heating chamber to form a single chamber;

dehydrating the lower length portion of the preform by exposing said lower length portion to a first heating zone of the furnace tube set at a dehydration temperature, and gradually lowering the optical preform through the first heating zone so as to dehydrate the upper length portion of the optical fibre preform, wherein, the furnace tube has a second heating zone positioned below the first heating zone and set at a consolidation temperature, wherein gradually lowering the optical fibre preform further comprises exposing successive length portions of the preform to the first heating zone and subsequently to the second heating zone until the whole optical fibre preform has passed through the first heating zone.

2. The method of claim 1, further comprising, after passing the optical fibre preform through the first heating zone, continuing to gradually lower the preform through the second heating zone until the whole optical fibre preform has passed through the second heating zone so as to consolidate the whole optical fibre preform.

3. The method of claim 1, further comprising, before inserting a lower length portion of the optical fibre preform, holding in suspension the optical fibre preform by a supporting member connected to a first lifting mechanism for vertically moving the preform.

4. The method of claim 3, further comprising, after providing an extension tube and before enclosing the upper length portion of the optical fibre preform, holding in suspension the extension tube above the optical fibre preform and lowering the extension tube until it surrounds and encloses the upper length portion of the optical fibre preform.

5. The method of claim 1, further comprising, after providing an extension tube and before enclosing the upper length portion of the optical fibre preform, holding in suspension the extension tube above the optical fibre preform and lowering the extension tube until it surrounds and encloses the upper length portion of the optical fibre preform.

6. The method of claim 5, wherein the extension tube is connected to a second lifting mechanism for a vertical movement independent of the vertical movement of the preform.

7. The method of claim 1, wherein the first heating zone is vertically positioned adjacent to the upper entry opening such that the preform enters the first heating zone right after the insertion in the furnace tube.

8. The method of claim 1, wherein gradually lowering of the optical fibre preform is at a downfeed rate is of from 4 mm/min to 7 mm/min.

9. An apparatus for drying a porous optical fibre preform, comprising:
  a furnace comprising a furnace tube comprising an elongated heating chamber for housing and moving a preform in a vertical direction, wherein the heating chamber has an upper entry opening for the insertion of the preform, the furnace further comprising a first heater surrounding the furnace tube for heating a first longitudinal section of the heating chamber defining a first heating zone, and
  an extension tube comprising an extension chamber having a lower opening, the extension tube being removably joint to the furnace tube so as to close the upper entry opening, wherein the lower opening is in communication with the upper entry opening when the extension tube is joined to the furnace tube to form a single chamber, the extension chamber being configured to house at least a length portion of the preform, wherein:
  the appearance is for drying and consolidating a porous optical fibre preform and the furnace further comprises a second heater placed below the first heater and surrounding the furnace tube for heating a second longitudinal section of the heating chamber defining a second heating zone for consolidation of the porous optical fibre preform.

10. The apparatus of claim 9, wherein the furnace tube and the extension tube are made of glass so as joining the furnace tube with the extension tube is a glass-to-glass seal.

11. The apparatus of claim 9, wherein the furnace tube comprises a first flange positioned radially outwardly the upper entry opening and the extension tube comprises a second flange positioned radially outwardly the lower opening, the first and the second flange comprising a respective joining surface, wherein joining is achieved by joining the joining surfaces of the first and of the second flanges.

12. The apparatus of claim 9, further comprising a supporting member for holding in suspension a preform, the supporting member being operatively connected to a first lifting mechanism for the translational movement of the preform up and down in the longitudinal direction (20), wherein the supporting member comprises a holding portion for holding the preform and a supporting rod for the connection with the first lifting mechanism.

13. The apparatus of claim 9, wherein the extension tube is operatively connected to a second lifting mechanism for holding in suspension the extension tube above the preform when it is not joined to the furnace tube and for causing the extension tube to move up and down independently of the supporting member.

14. The apparatus of claim 13, wherein the extension tube comprises a cover plate opposite to the lower opening and having a throughhole through which the supporting rod passes.

* * * * *